(No Model.) 2 Sheets—Sheet 1.
I. G. RIDER, W. H. SNYDER, & A. O. FRICK.
TRACTION ENGINE.
No. 277,784. Patented May 15, 1883.
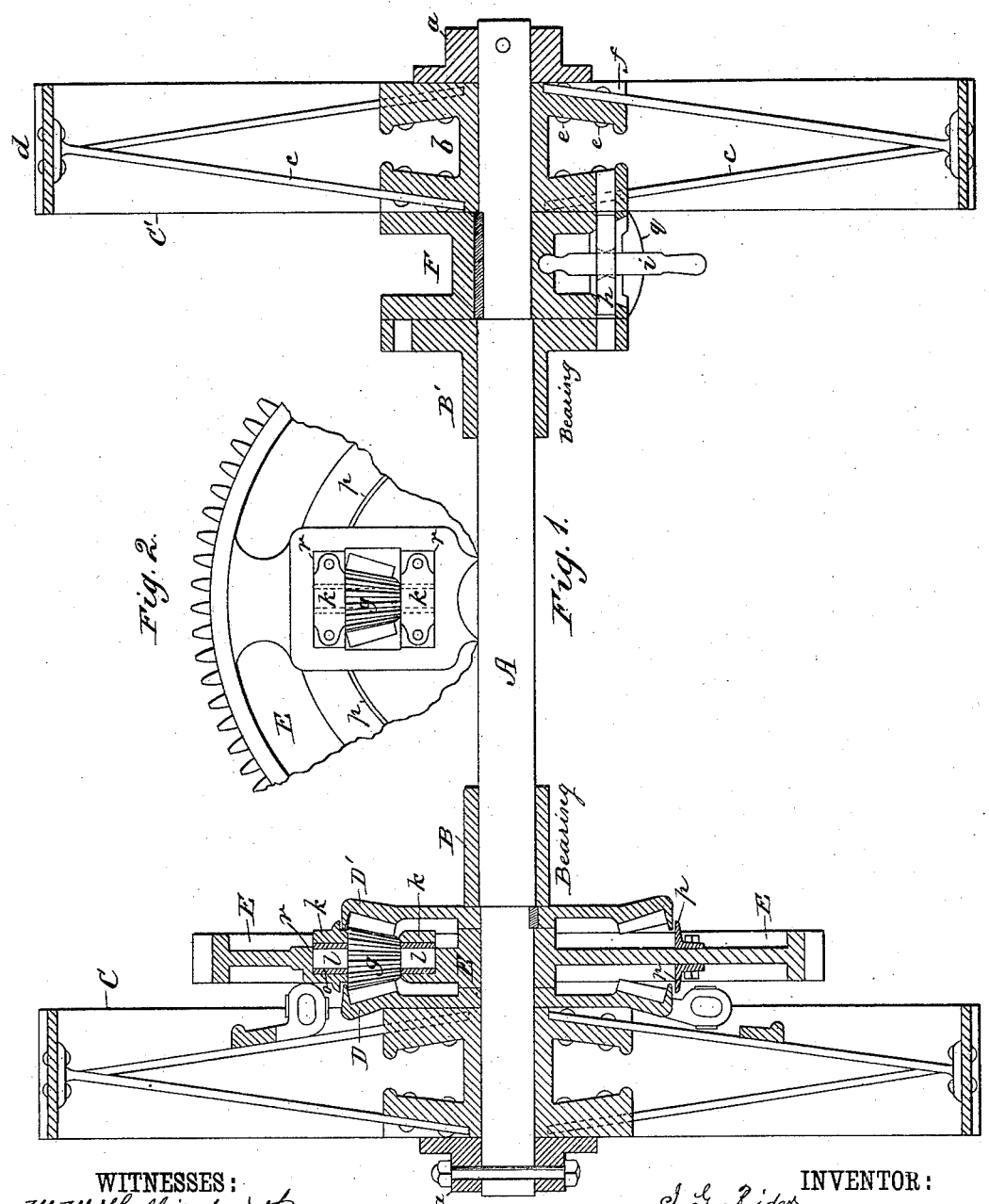

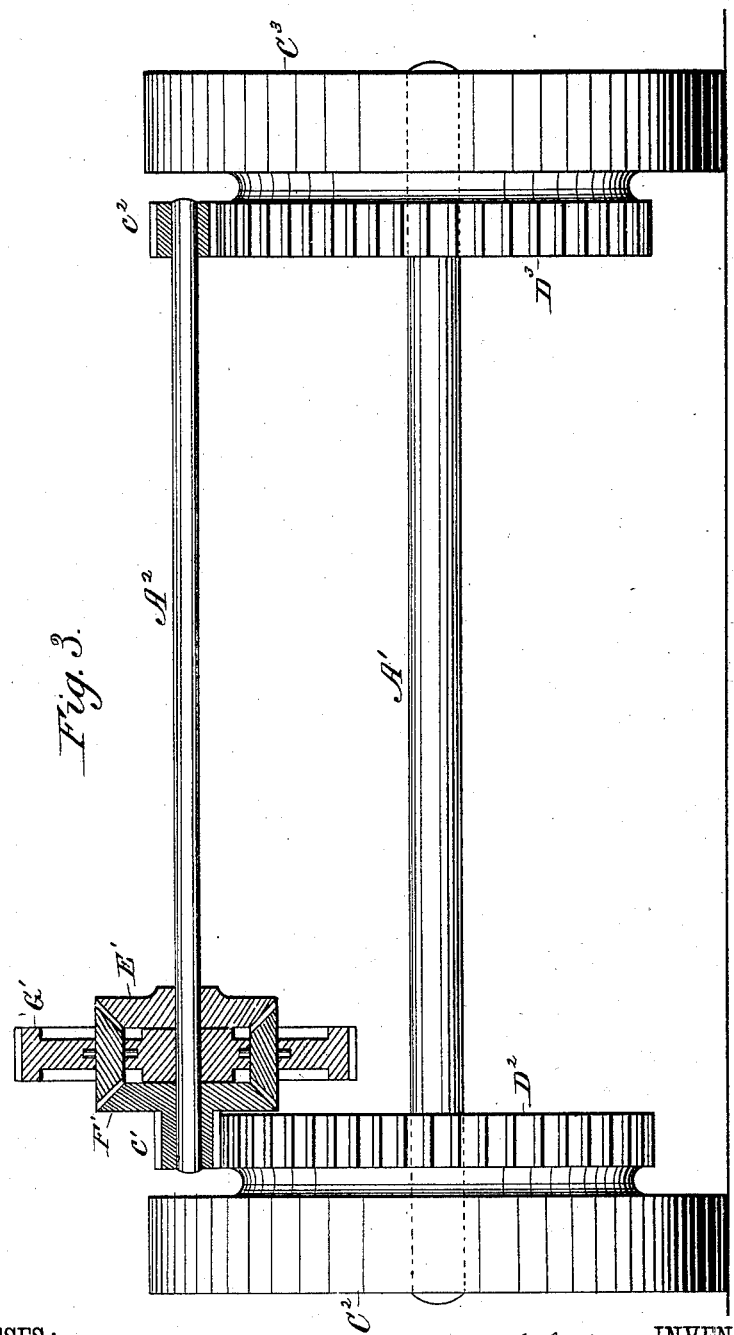

UNITED STATES PATENT OFFICE.

IGNATIUS G. RIDER, WILLIAM H. SNYDER, AND ABRAHAM O. FRICK, OF WAYNESBOROUGH, PENNSYLVANIA.

TRACTION-ENGINE.

SPECIFICATION forming part of Letters Patent No. 277,784, dated May 15, 1883.

Application filed January 25, 1883. (No model.)

*To all whom it may concern:*

Be it known that we, IGNATIUS G. RIDER, WILLIAM H. SNYDER, and ABRAHAM O. FRICK, of Waynesborough, in the county of Franklin and State of Pennsylvania, have invented a new and useful Improvement in Traction-Engines; and we do hereby declare that the following is a full, clear, and exact description of the same, reference being had to the accompanying drawings, forming part of this specification, in which—

Figure 1 is a vertical section taken through the main wheels, the compensating-gear, and the locking mechanism on the main axle. Fig. 2 is a broken view of the side of the gear-wheel E, showing the means for holding the pinion in place. Fig. 3 is a view similar to Fig. 1, showing a modification of our invention.

In the use of traction or road engines it is very desirable to have it geared so that it can operate with great power and little speed, or can be run at a higher speed when not much power is required. Thus, for instance, in traveling in one direction the engine may be loaded, and when returning from its destination it may be unloaded. In the first instance it should be geared for power, and in the latter, to economize time, it may be geared for speed. Again, some parts of the road may be heavy and the rest good, and in such case an adaptation may be made of the gearing to suit these circumstances.

Our invention consists in the combination, with the two wheels of a traction-engine, of a compensating-gear which derives motion from the driving machinery and transmits it independently to each of the two wheels, whereby either or both wheels may be driven, a locking mechanism for holding rigid one of the wheels of the compensating-gears which transmit motion to one of said traction-wheels, and an adjustment whereby that traction-wheel may be released and allowed to run freely or passively independent of its driving mechanism, whereby the value of a compensating-gear in this class of machines is preserved for turning corners, &c., and whereby, also, the desired result of attaining two speeds for the traction-engine may be made available with very little addition to the ordinary mechanism.

The invention also consists in other features of construction in detail, as will be hereinafter more fully described.

In the drawings, A represents the main axle of a road-engine, which is journaled in the bearings B B', that are rigidly fixed to the frame-work of the engine.

C C' are the supporting-wheels, which are loose on the ends of the axle, and are prevented from coming off by the caps *a a*. These wheels are formed of cast hubs *b*, spokes *c*, and a tire, *d*, the hub being cast with oblique grooves *f*, into which are placed the inner ends of the spokes *c*, which are fastened by rivets *e*, passing through the sides of the spokes and the flanges of the hub. This method of constructing the wheel permits any one of the spokes to be removed and replaced by a new one if bent or broken, and in this respect has a great advantage over fastening the spokes in the hub by casting them in the same, as usually practiced.

On the axle, and between one of the wheels C and the stationary bearings B, is arranged the compensating-gear, which, in general construction, resembles that in ordinary use—that is to say, it consists of two bevel-wheels, D D', facing each other, one of which, D, is rigid with main wheel C, and the other of which, D', is rigid with the axle, and an intermediate gear-wheel, E, bearing bevel-pinions *g*, which mesh with both the bevel-wheels D D', the whole being so arranged that when power is imparted from the engine through wheel E it is made to act equally upon both bevel-wheels D D', and consequently upon both main wheels, but still the said main wheels may have an independent motion, as is required in turning. Now upon the axle, and between the stationary bearing B' and the wheel C', we fix by a key or otherwise a hub or boss, F, which is always rigid with the axle. This hub or boss is made with two disk-shaped flanges, one of which faces the hub of the wheel C', and the other of which faces a corresponding disk or flange on the bearing B' of the main frame. In the two flanges of the hub or boss F is arranged a sliding bolt, *h*, of just the length of the boss, which is operated by a lever, $i$, passing through a slot in said bolt and fulcrumed in a seat in the boss. Now, it will be seen that the flange of the bearing B' is provided with a circular series of perforations adapted to be brought into registration with the bolt of the boss or hub F, and into which the bolt may be thrust, and the hub of the wheel C' on this side is also provided with one or more locking-holes to receive the same bolt when thrust in the opposite direction. This device constitutes a sort of double clutch, which coacts with the compensating-gear as follows: When the engine is to be geared for power, the bolt is thrown to the right, coupling the boss F (which is rigid on the axle) to the hub of the wheel C'. It will therefore be seen that the wheel C' is thus made rigid with the axle. Now the wheel C is driven by its attached bevel-wheel D, while the wheel C' is driven through boss F and the axle by the bevel-wheel D', and both the main wheels will be actively driven and have one revolution for every revolution of the gear-wheel E, which receives motion from the engine. The main wheels C C' will in this adjustment both be driven at the normal working speed and the engine will be geared for its greatest power. If we throw the bolt of boss F to the left now, and couple said boss to the disk of bearing B', two results are accomplished: First, the wheel C' is loosened from the axle and is free to revolve thereon; and, secondly, the axle and its bevel-wheel D' are held stationary by being locked to the rigid bearing B' of the frame-work of the engine. Now, as motion is imparted to wheel E from the engine, it will be seen the bevel-pinions $g$, which it carries, will travel over the teeth of the stationary bevel-wheel D', and the result will be that twice the speed will be given to bevel-wheel D and the main wheel C, because bevel-wheel D will then have the motion derived from the rotation of wheel E, and also the motion derived from the secondary rotation of the bevel-pinions $g$ over the stationary bevel-wheel D'. The result will be that the main wheel C' will become then a passive running-wheel, while C is the active wheel or driver and travels at twice its former speed. This wheel is amply sufficient to drive the engine on a good road or when it is not heavily loaded, and the increased speed secures a great saving of time.

Another adjustment which our gearing is capable of is that shown in Fig. 1 of the drawings, in which the bolt is wholly within the boss F, and does not lock the boss either to the bearing B' or to the wheel C'. With this adjustment both main wheels may be chocked or held firmly, and then the axle simply revolves loosely in the hubs at the highest speed, the axle being driven through its bevel-wheel D', which is rotated at double the usual speed by reason of the travel of the pinion $g$ of wheel E over the now stationary bevel-wheel D. This adjustment of the device is very useful, for the axle in that case takes the place of a counter-shaft for connecting with and driving any other piece of machinery; or a winding-drum may be located on the axle for raising weights; or the adjustment can be made to advantage when stopping for pumping up water and other purposes.

With respect to the mechanism for locking the axle to the wheel C' or the stationary part of the frame-work, we would state that we prefer the arrangement shown, for the reason that it is double-acting and protected from dirt; but we do not confine ourselves to the same, as separate devices for locking the wheel to the axle and the axle to a stationary part of the frame-work may be used.

In fitting the bevel-pinions $g$ in the wheel E of the compensating-gear it has been customary to form an offset on the wheel E and bore through it at right angles to the axle to form the journal-bearing for the pinion. By this method, however, it was almost impossible to get the axis of the pinion sufficiently true to cause all the pinions (of which there are several) to bear equally against the bevel-wheels D and D', and the result was, that frequently one pinion would carry all the strain and do all the work until it broke from being over-taxed. To obviate this difficulty we form the wheel E with recesses $r$ on each side of the opening for the pinion, which recesses open laterally to the wheel, and which are closed by boxes $k$ $k$. In these recesses the stems or journals $l$ of the pinions are placed, the boxes $k$ $k$ placed over them, the bevel-wheels D D' adjusted up to position, and then a filling, $o$, of melted metal is run around the journals of the pinions, which causes the latter to become set in a true and easy position in which they all bear equally upon the bevel-wheels in transmitting the working strain. With respect to this feature of our invention, we would state that, while we do not claim it in this case, we reserve the right to make the same the subject-matter of a subsequent application.

On the wheel E, just outside of the bevel-wheels D D', are formed overlapping lips $p$ $p$, which exclude dust and dirt from the gears. A guard or shield, $q$, is also arranged about the boss F, to protect the bolt and shifting-lever.

In the use of our invention we do not confine ourselves to the particular form of compensating mechanism shown, nor do we confine ourselves to a direct rigid connection of the compensating-gears D and D' to the parts they actuate, as springs may be interposed between D and the wheel C, or between D' and the axle, for making the strain elastic. For simplicity, however, we have shown the gears D and D' rigidly connected to the parts which they actuate.

We would state, also, that the same general result of giving two speeds to the engine, as aimed at in our invention, could be accomplished by placing the compensating-gear on the counter-shaft or other shaft of the engine than the axle, as shown in Fig. 3, in which $C^2$ $C^3$ are the traction-wheels, which revolve loosely on their axle A'. D² D³ are gear-wheels rigidly connected to the traction-wheels. Pinion c' is rigidly connected to bevel-gear F' of the compensating-gear, and said pinion c' and bevel-gear F' are loose on counter-shaft A². Bevel-gear E' is fast or rigid on counter-shaft, and pinion c² is capable of being locked rigid on the counter-shaft. Now, it will be seen that by holding or locking bevel-gear E' and counter-shaft and unlocking pinion c² we will increase the speed of traction-wheel C² on the same principle hereinbefore described, and wheel C² would be the driver, while C³ would be a passive running-wheel, as would also pinion c², which then revolves loosely on the counter-shaft.

In defining the scope of our invention with greater clearness, we would state that we are aware of the English Patent No. 134 of 1880, in which is shown a velocipede having a triple arrangement of bevel-gears and locking a clutch device for giving two speeds to the wheel from the simple revolution of the crank-shaft. The generic principle involved here is similar to that employed by us; but our organization differs therefrom essentially in the following respects: The compensating-gear as employed by us always coacts with two driving-wheels, and has two functions: first, that of imparting independent motion to both wheels to permit the machine to turn corners; and, secondly, in giving the two speeds, for which purpose it is necessary in our organization to make two adjustments—namely, to lock one of the compensating-gears, and then unlock the traction-wheel which is tributary to that gear. In the English patent the organization disclosed shows but one wheel, and hence no such double function exists, as in our invention. While, therefore, we do not claim, broadly, the principle involved for imparting two speeds to a running-wheel, we are not aware that said principle has been applied to the two wheels of a traction-engine for accomplishing the two purposes aimed at by us, in which connection the compensating-gear coacts with both traction-wheels, and a double adjustment is required for the increased speed.

What we claim is—

1. In a traction-engine, the combination, with its two traction-wheels, of a compensating-gear for dividing and transmitting the power of the engine independently to each of the two traction-wheels, a locking device for holding one of the compensating-gears, and a releasing mechanism for disconnecting the traction-wheel tributary to that gear and permitting it to run passively, whereby the other traction-wheel is made to double its speed, substantially as set forth.

2. In a traction-engine, the combination of the main axle and its two traction or running wheels, both revolving loosely on the axle, a compensating mechanism having one of its gears connected to one of the running-wheels and its other gear connected to the axle, and a single locking device adapted to lock the axle to the other running-wheel when thrown in one direction, and when thrown in the other direction to disconnect the axle and running-wheel and rigidly lock the axle to a stationary part of the frame-work, as and for the purpose described.

3. The combination, with the axle of a traction-engine, of the loose wheel C', the boss F, made rigid with the axle, the stationary bearing B', and the locking-bolt, adapted, as described, to lock the boss to the wheel, the boss to the stationary bearing, or to disconnect the boss from both, as shown and described.

4. The combination, with the bevel-wheels D and D', of the intermediate gear-wheel, E, bearing pinion g, and having lips p p extending over the edges of the gear-wheels D D', as and for the purpose described.

IGNATIUS G. RIDER.
WILLIAM H. SNYDER.
ABRAHAM O. FRICK.

Witnesses:
D. M. GOOD, Jr.,
FRED. FRICK.